US012490924B2

United States Patent
Delplanque et al.

(10) Patent No.: US 12,490,924 B2
(45) Date of Patent: Dec. 9, 2025

(54) METHOD OF DETECTION IN AN ELECTRICALLY CONDUCTIVE MEDIUM

(71) Applicants: ELWAVE, Carquefou (FR); INSTITUT MINES TELECOM, Palaiseau (FR)

(72) Inventors: Quentin Vincent Delplanque, Nantes (FR); Lyes Ifrek, Nantes (FR); Frédéric Boyer, Mouzeil (FR); Vincent Paul Yannick Lebastard, La Chapelle Launay (FR)

(73) Assignees: ELWAVE, Carquefou (FR); INSTITUT MINES TELECOM, Palaiseau (FR)

( * ) Notice: Subject to any disclaimer, the term of this patent is extended or adjusted under 35 U.S.C. 154(b) by 627 days.

(21) Appl. No.: 17/998,908

(22) PCT Filed: May 12, 2021

(86) PCT No.: PCT/EP2021/062741
§ 371 (c)(1),
(2) Date: Nov. 15, 2022

(87) PCT Pub. No.: WO2021/229010
PCT Pub. Date: Nov. 18, 2021

(65) Prior Publication Data
US 2023/0190165 A1 Jun. 22, 2023

(30) Foreign Application Priority Data
May 15, 2020 (FR) ........................................ 2004882

(51) Int. Cl.
*A61B 5/282* (2021.01)
*G01V 3/08* (2006.01)
*G01V 3/38* (2006.01)

(52) U.S. Cl.
CPC ................ *A61B 5/282* (2021.01); *G01V 3/38* (2013.01); *G01V 2003/084* (2013.01); *G01V 2003/085* (2013.01)

(58) Field of Classification Search
CPC . A61B 5/282; G01V 3/08; G01V 3/38; G01V 2003/084; G01V 2003/085
See application file for complete search history.

(56) References Cited

U.S. PATENT DOCUMENTS

| 5,026,640 | A | 6/1991 | Kelemen et al. |
| 2011/0061455 | A1* | 3/2011 | Payton ..................... G01V 7/04 |
| | | | 73/152.59 |

(Continued)

FOREIGN PATENT DOCUMENTS

| FR | 2694333 | A1 | 2/1994 |
| GB | 2443246 | A | 4/2008 |

(Continued)

OTHER PUBLICATIONS

Qingxuan Ren et al., "amplitude information-frequency characteristics for multi-frequency excitation of underwater active electrolocation systems", Nov. 19, 20219, DOI :10.1088/1748-3190/AB526B.

(Continued)

*Primary Examiner* — Farhana A Hoque
*Assistant Examiner* — Joseph O Nyamogo (57) ABSTRACT

This method can be used to locate or identify an object in an electrically conductive medium with a detection system that comprises n electrodes in direct electrical contact with the conductive medium. The n electrodes can be placed in at least three different states: transmitting, receiving, disconnected. Before a series of measurements, the operating point of the detection system is determined according to a given a priori setpoint, or a previous configuration of the system, or a previous measurement result of one of the electrodes, by the configuration of the state of each of the electrodes, the (Continued)

frequency of a sinusoidal component of an electrical signal transmitted by one of the transmitting electrodes, or the amplitude of the electrical signal transmitted by one of the electrodes configured in the transmitting or receiving state.

14 Claims, 9 Drawing Sheets

(56) References Cited

U.S. PATENT DOCUMENTS

2013/0193975 A1* 8/2013 Qu ............................ G01V 3/26 324/351
2020/0292458 A1* 9/2020 Leukkunen ............ G01N 21/67

FOREIGN PATENT DOCUMENTS

| JP | 3693946 B1 | 9/2005 |
|---|---|---|
| WO | WO2013014392 A1 | 1/2013 |

OTHER PUBLICATIONS

James R. Solberg et al., "active electrolocation for underwater target localization", The International Journal of Robotics Research, vol. 27, No. 5, pp. 529-548, May 2008, DOI:10.1177/0278364908090538.

Von der Emde et al., "Biomimetic sensors:active electrolocation of weakly electric fish as a model for active sensing in technical systems", Journal of Bionic Engineering 4, 2007, DOI:10.1016/S1672-6529(07)60018-3.

F. Boyer et al., "Underwater reflex navigation in confined environment based on electric sense", IEEE Transactions on robotics, vol. 29, No. 4, Aug. 2013, DOI:10.1109/TRO.2013.2255451.

Jiegang Peng, "A study of amplitude information-frequency characteristics for underwater active electrolocation system", Bioinspiration & Biomimetics, Nov. 4, 2015, DOI:10.1088/1748-3190/10/6/066007.

Yang Bai et al., "Enhanced detection performance in electrosense through capacitive sensing", Bioinspiration & Biomimetics, Aug. 8, 2016.

Y. Silverman et al., "Location and orientation estimation with an electrosense robot," 2012 IEEE/RSJ International Conference on Intelligent Robots and Systems, 2012, pp. 4218-4223, doi: 10.1109/IROS.2012.6386167.

Notification under Article 94(3) EPC dated Jun. 13, 2024 for European Application No. 21726092.6.

First Examination Opinion Notice for Chinese Patent Application No. 202180035276.1, dated Sep. 29, 2025.

Qingxuan Ren et al., "Amplitude information-frequency characteristics for multi-frequency excitation of underwater active electrolocation systems," Bioinspiration & Biomimetics, 2019.

* cited by examiner

METHOD OF DETECTION IN AN ELECTRICALLY CONDUCTIVE MEDIUM

CROSS-REFERENCE TO RELATED APPLICATION

This application is a national stage application, filed under 35 U.S.C. § 371, of International Patent Application No. PCT/EP2021/062741, filed May 12, 2021, which claims priority to France application No. FR2004882 filed May 15, 2020, which is incorporated by reference herein in its entirety.

FIELD OF THE INVENTION

The present invention relates to a method of detection in an electrically conductive medium.

TECHNOLOGICAL BACKGROUND

More specifically, the invention relates to a method of detection in an electrically conductive medium by means of a system containing a plurality of electrodes allowing it to make use of the electric sense, i.e. an electric field is generated by certain electrodes and measurements of electrical values associated with this electric field are used to obtain information about the conductive medium itself or about objects situated in the conductive medium.

In the field of detection in an electrically conductive medium, it is known to measure electrical values by means of receiving electrodes in order to deduce therefrom information about the presence of objects or borders, or geometric parameters, such as the shape of these objects or borders, as well as their orientations, in the conductive medium, without prior knowledge of these geometric parameters.

For example, the document WO2013014392A1 describes a method to control the movement of a mobile system in an electrically conductive medium, the system containing at least one electrode in contact with the medium. This method contains in particular a step of measuring an electrical characteristic—and more specifically an electric current intensity—of the medium by means of this electrode, then called receptor-type electrode. In a particular embodiment, the control method provides a step of managing, possibly in an automated manner, the electrical connectivity of the electrodes, which can be generator-type and/or receptor-type electrodes, with the aim of optimizing the detection range or the accuracy of the positioning of the mobile system with respect to a detected object.

However, the method described by WO2013014392A1 has the aim of optimally managing the movement of a mobile system. The management of the electrical connectivity of the electrodes is based on the movement of the mobile system. In particular, three connectivity modes are defined: the attraction mode, which makes it possible to approach an object, the repulsion mode, which makes it possible to move away from it, and the object boundaries following mode, which makes it possible to move along an object. It is also possible to configure the electrodes in a mode wherein the detection range is optimal.

However, the electrical value measured (amplitude of an electric voltage or of an electric intensity, at a fixed frequency) together with the possible states of the electrodes (generator-type, emitting or connected to a terminal common to several electrodes (called terminal B1 in this document)) do not make it possible to obtain maximum performance for values of interest for the perception other than the detection range or the accuracy of the positioning of the mobile system, such as the shape, the size or the nature of the material of the detected object.

The invention thus relates to a method of detection in an electrically conductive medium, possibly implemented independently of a mobile system, making it possible to dynamically and automatically optimize the performance of a detection system in terms, either of range of detection or of locating of an object or of determination of the shape of an object or the nature of an object.

SUMMARY OF THE INVENTION

Thus, the invention relates to a method of detection in an electrically conductive medium by means of a detection system containing a plurality of electrodes in direct electrical contact with this conductive medium.

The detection system comprises:
a plurality of electrodes (Ei) in direct electrical contact with said medium, the state of which can be chosen from the list {emitting, receiving, disconnected},
a device for measuring at least one electrical value for each of said electrodes configured in the emitting or receiving state, chosen from the list {electric intensity passing through the electrode, electric potential of the electrode},
a switching device making it possible to configure each of said electrodes in the state chosen from the list {emitting, receiving, disconnected},
at least one processor exchanging information with the measurement device and the switching device.

The method comprises the following steps:
a. the processor determines the operating point of the detection system as a function of:
a setpoint given a priori,
and/or an earlier configuration of the detection system,
and/or a result of an earlier measurement at the level of at least one of the electrodes transmitted by the measurement device,
the determination of said operating point of the detection system comprising the determination of the following three parameters:
state of each of the electrodes, chosen from the three states: emitting, receiving, disconnected,
frequency of at least one sinusoidal component of an electrical signal emitted by at least one of the electrodes configured in the emitting state,
amplitude of the electrical signal emitted by at least one of the electrodes configured in the emitting state,
b. the switching device receives information about the operating point of the system determined by the processor and configures the detection system in the determined operating point,
c. a series of measurements is carried out by the measurement device, a series of measurements consisting of evaluating at least one electrical value at the level of each of the electrodes configured in the receiving or emitting state, and the measurement device transmits the measurement data to the processor.

Owing to these arrangements, it is possible to automatically and dynamically configure the state of the different electrodes such that the detection performances are maximal with respect to a detection objective determined before each series of measurements. For example, the objective can be, by way of example, to optimize the range of the detection in one or more spatial directions, or else the accuracy of the locating of a detected object, or else the accuracy of the recognition of the shape and/or nature of this object.

In an embodiment, the detection method moreover comprises an additional step, called step d, during which the processor calculates, based on the measurement data, at least one item of mapping data of the conductive medium.

Thanks to this arrangement, the detection system can, at the end of a series of measurements, provide a map of all or part of the space which surrounds it. This map can then be used to move a mobile system.

In an embodiment, the steps of the method are repeated in the same order at least once, and the setpoints are transmitted to said processor in order to control the repetition of the steps either before the first step a of the detection method by a remote or non-remote operator or during the detection method by a remote operator.

Thanks to this arrangement, the map provided by the detection system can be enhanced by additional information originating from the successive series of measurements and possibly adapted in real time. This map can then be used to move a mobile system, or else to follow the evolution of the nature and/or the position of one or more objects present in this surrounding space.

In an embodiment of the method, the operating point of the system determined in step a can be chosen from the list {"range" mode, "locating" mode, "identification" mode}, the "range" mode making it possible to obtain the maximum detection range in one or more given directions of said medium, the "locating" mode making it possible to obtain the maximum accuracy regarding the locating of a previously detected object, the "identification" mode making it possible to obtain the best resolution with respect to the shape and/or the composition of a previously detected object.

In an embodiment of the method, the operating point of the detection system passes automatically from a step a to the next:
  from the "range" mode, if it was in this mode, to the "locating" mode when an object is detected and this object is located at a distance smaller than a threshold distance d2,
  from the "locating" mode, if it was in this mode, to the "identification" mode when an object is detected and this object is located at a distance smaller than a threshold distance d3 or with a shape and/or nature corresponding to a setpoint,
  from the "locating" mode, if it was in this mode, to the "range" mode when an object is detected and the distance at which a detected object is situated becomes greater than a threshold distance d2.

These arrangements make it possible for the detection system to pass automatically from the range mode to the locating mode when it gets closer to a detected object, then to the identification mode when it gets even more closer to the detected object, and finally to return to the range mode if it moves away from an object after having passed into the locating mode.

In an embodiment of the method, the shape and/or the frequency and/or the amplitude of the signal emitted by the electrodes configured in the emitting state for an operating point determined in step a are chosen at the end of a frequency scan.

Thanks to this arrangement, the optimum working frequency for the series of measurements to come is determined without prior knowledge of the surrounding space.

In an embodiment of the method, the signal emitted by at least one of the electrodes configured in the emitting state for an operating point determined in step a is the combination of at least two sinusoidal signals having different frequencies.

Thanks to this arrangement, information corresponding to each of the frequencies is collected, making it possible to detect particular elements of the surrounding space, such as, by way of example, an interface between two different media.

In an embodiment of the method, if an object is detected in step d, the amplitude and/or the shape and/or the frequency of the sinusoidal components of the electrical signal emitted by each of the electrodes configured in the emitting state for an operating point determined in a later step a are determined as a function of the distance of the detected object.

This arrangement also makes it possible to construct, step by step, a map of the surrounding space, or else to move a mobile system dynamically, i.e. by optimizing the operating point of the series of measurements to come as a function of the results of the detection of the last series of measurements carried out.

In an embodiment of the method, if an object is detected in step d, the positions on said system of the electrodes configured in the emitting state for an operating point determined in a later step a are determined as a function of the shape and/or the position of a detected object.

This arrangement makes it possible to construct, step by step, a map of the surrounding space, or else to move a mobile system dynamically, i.e. by optimizing the operating point of the series of measurements to come as a function of the results of the detection of the last series of measurements carried out.

In an embodiment of the method, known references are used to determine the at least one item of mapping data in step d.

Thanks to this arrangement, abacuses comprising electrical object signatures for example can be used to deduce the nature of the detected objects.

Correlatively, the invention relates to a computer program comprising program code instructions for executing the steps of the detection method when the program is executed on a computer.

The invention also relates to a system of detection in an electrically conductive medium containing
  a plurality of electrodes ($E_i$) in direct electrical contact with said medium, the state of which can be chosen from the list {emitting, receiving, disconnected},
  a device for measuring at least one electrical value for each of said electrodes configured in the emitting or receiving state, chosen from the list {intensity of the electric current passing through the electrode, electric potential of the electrode},
  a switching device making it possible to configure each of said electrodes in the state chosen from the list {emitting, receiving, disconnected},
  at least one processor exchanging information with the measurement device and the switching device, and configured to determine the operating point of the detection system as a function of:
    a setpoint given a priori,
    and/or an earlier configuration of the system,
    and/or a result of an earlier measurement at the level of at least one of said electrodes transmitted by the measurement device,
  the determination of said operating point of the system comprising the determination of the following three parameters:

state of each of the electrodes, chosen from the at least three states: emitting, receiving, disconnected, frequency of at least one sinusoidal component of an electrical signal emitted by at least one of the emitting electrodes, amplitude of the electrical signal emitted by at least one of the electrodes configured in the emitting state, the processor transmitting information about the determined operating point to the switching device.

In an embodiment, the mobile system moreover contains a control module configured for controlling the movement of said mobile system on the basis of the measurement results of the detection system obtained by following the detection method in one of the embodiments described above.

Thanks to this arrangement, the mobile system can move without prior knowledge of the medium in which it is manoeuvring.

In an embodiment of the mobile system, the electrodes of the detection system with which the mobile system is equipped are distributed over at least a portion of the surface of said mobile system in contact with said medium.

BRIEF DESCRIPTION OF THE DRAWINGS

Embodiments of the invention will be described below with reference to the drawings, briefly described below.

In the drawings, identical references denote identical or similar objects.

DETAILED DESCRIPTION

Thus, the invention relates to a method of detection in an electrically conductive medium by means of a detection system.

The detection system implementing the method comprises a plurality of electrodes $E_i$ intended to be in direct electrical contact with the conductive medium.

For example, the electrodes $E_i$ can be distributed at choice on the external surface of a mobile system 100 which is equipped with the detection system, such that the electrodes are in direct electrical contact with the conductive medium.

The conductive medium is water for example.

Figure 1:
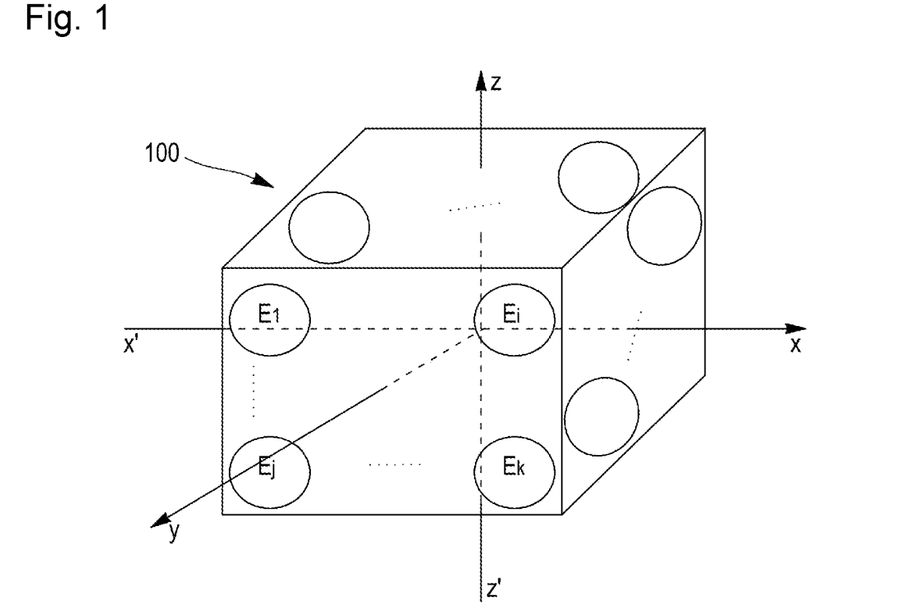
FIG. 1 shows an embodiment of a mobile system equipped with a detection system provided with electrodes distributed at the level of its surface in contact with the external medium.

FIG. 1 schematically shows a mobile system 100 according to a particular embodiment of the invention. This mobile system 100 contains a parallelepipedal body with dimensions of the order of 1000 mm*1000 mm*1000 mm. The three axes of this parallelepiped, centred on the centre O of the parallelepiped, constitute a space frame of reference (Oxyz) for the frame of reference of the detection system.

The n electrodes $E_i$ (i integer comprised between 1 and n) of the detection system can be distributed on the surface of the mobile system 100 so as to be in contact with the electrically conductive medium. In the particular embodiment described here, the surface of a given electrode $E_i$ exposed to the conductive medium is a disc and 24 electrodes are distributed on the corners and over the edges of the parallelepiped.

This embodiment is not limitative. The distribution and/or the shape of the electrodes $E_i$ can be adapted to the geometry of the mobile system and of the conductive medium to be explored. In particular, it is possible to place some of the electrodes on each of the faces of the parallelepiped.

The mobile system 100 can also not be parallelepipedal. For example, it can be cylindrical or of any shape.

In the case where the mobile system 100 contains several portions that are mobile in relation to each other, the electrodes $E_i$ can be distributed over all of these mobile portions or only over a fraction thereof.

The number of electrodes $E_i$ can also be adapted to the dimensions of the mobile system. In the case of a parallelepiped with a characteristic dimension of the order of 1000 mm, 8 electrodes arranged at the eight vertices of the parallelepiped make it possible for example to explore all of the directions of the space surrounding the parallelepiped without leaving a blind spot.

The electrodes are resistant to corrosion, for example made of 316 stainless steel, or else of platinum, titanium or graphite, carbon fibre, and they are arranged on an electrically insulating support such as polyvinyl chloride.

Figure 12:
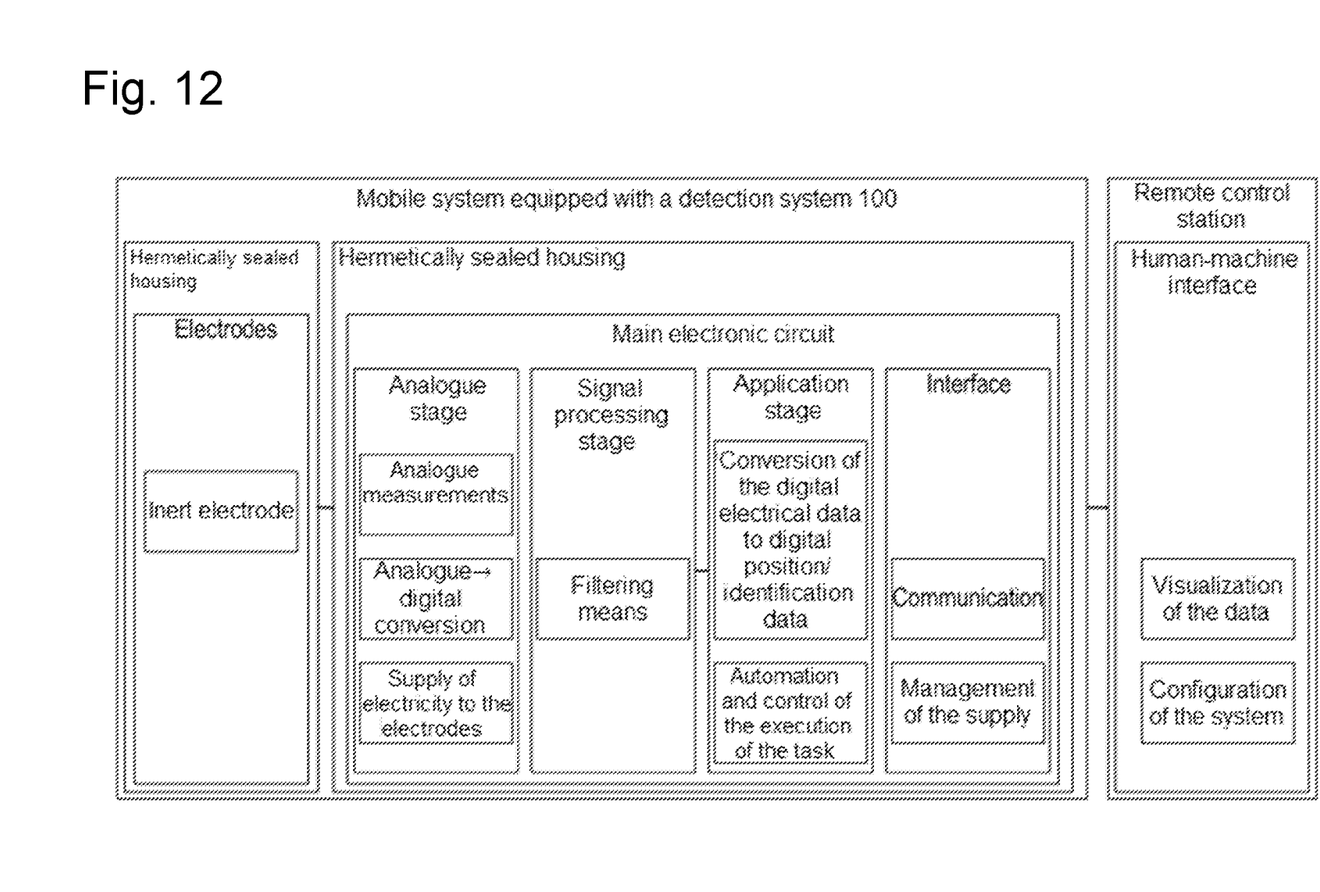
FIG. 12 schematically shows the different stages of the system in the "centralized electronics" embodiment.

In the "centralized electronics" embodiment according to FIG. 12, the electrodes $E_i$ are electrically connected, via a bundle of flexible cables, to a hermetically sealed housing with dimensions of the order of about ten centimetres.

Figure 2:
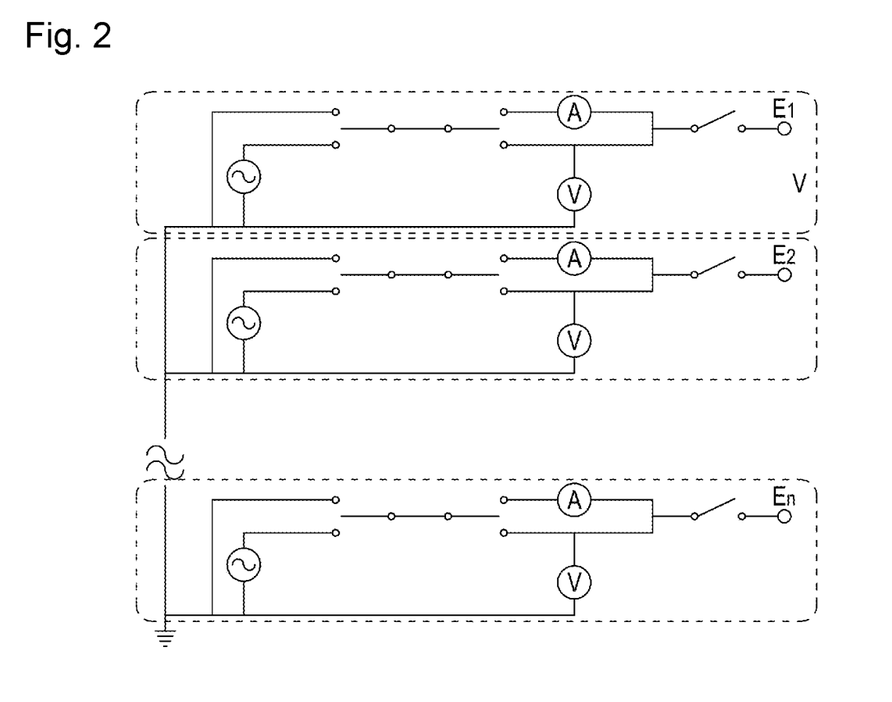
FIG. 2 shows an electrical architecture of a switching box.

In the embodiment described here, this housing contains:

the setpoint-generating block containing a microprocessor, a read-only memory containing a computer program that can be executed by the microprocessor, a random-access memory making it possible to execute this program, and means for communicating the setpoints to the switching box and for receiving the information originating from the switching box;

the switching box (or synonymously switching block), which contains as many switching cells as electrodes, as well as the electronic and electrical components necessary to realize the electrical circuit according to FIG. 2.

Figure 3:
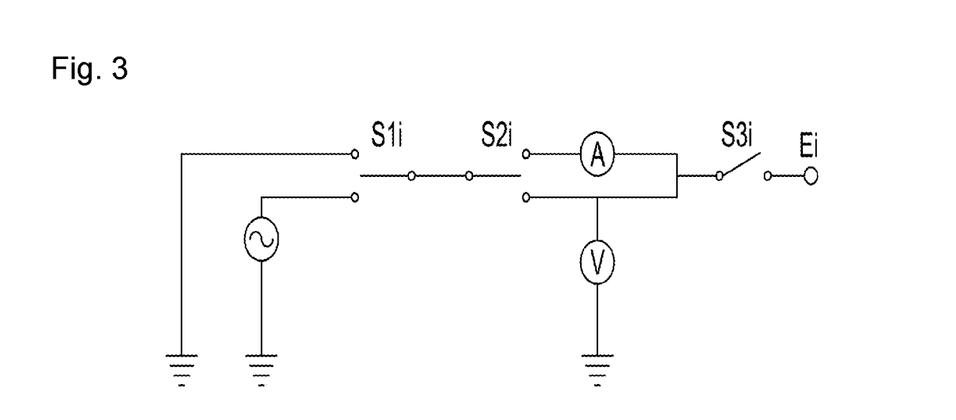
FIG. 3 shows, in detail, an example of a switching cell of a given electrode.

Each switching cell is dedicated to one electrode and can contain one generator per electrode, the means for measuring the electrical values, and the electrical and electronic components necessary to realize the electronic circuit according to FIG. 3. It is also possible for a generator to be shared between several electrodes, or even all of the electrodes.

Thus, for the electrode $E_i$, the switch $S_{3i}$ makes it possible to put the electrode i in the connected or disconnected connection state. If the electrode is connected, it can be put in the emitting state or in the receiving state via the switch $S_{1i}$.

A given electrode $E_i$ can therefore be in three different states: emitting (and therefore connected), receiving (and therefore connected), disconnected.

In this case, the switch $S_{2i}$ configures the electrode in measuring mode I or measuring mode U defined hereinafter.

The switches $S_{1i}$, $S_{2i}$, $S_{3i}$ can be controlled by the set-point-generating box, such that the state of each electrode can be freely configured in each step of the method.

In this embodiment, no human intervention is necessary at the level of the switch box. The reconfiguration of the electrodes can therefore be done remotely, automatically, as will be described below. In particular, when the detection system is immersed in the electrically conductive medium, it is possible to reconfigure the electrodes automatically without changing the position of the detection system or of the mobile system 100 which is equipped with this detection system.

The hermetically sealed housing of the detection system can be used as it is or integrated inside a mobile system 100 which is equipped with it, or else it can be placed on the external surface of such a mobile system 100.

It can for example be used within the context of the monitoring of the vibrations of fixed structures such as oil extraction infrastructure.

An electrode $E_i$ configured in the emitting state is connected to a suitable voltage generator, such that the amplitude, the frequency and/or the shape of the electric potential of the electrode can be imposed within the range permitted by the voltage generator.

Choosing the amplitude of the electric potential of an electrode put in the emitting state amounts to choosing the electrical power provided by the generator connected to this electrode. In order to simplify the wording, reference could synonymously be made to "choosing the power of the signal emitted by an emitting electrode".

The amplitude, the frequency and/or the shape of the electric potential of the electrode can be imposed for each electrode put in the emitting state independently of the other electrodes put in the emitting state.

For example, a generator can be provided for each electrode.

In another embodiment, one and the same generator can be connected to several electrodes put in the emitting state.

By way of non-limitative example, the amplitude of this electric potential can be chosen in the range [0 V, 15 V] and its frequency can be chosen in the range ]0 Hz, 3 MHz]. The shape of the potential can be sinusoidal, square, triangular by way of example. The electric potential can be periodic, or else contain only one or more pulses.

In the case where several generators are provided, all the generators connected to electrodes put in the emitting state are activated simultaneously.

The emitting electrodes each generate an electric field in the surrounding space. A fraction of lines of these fields end on the electrodes in the receiving state. This fraction depends on the emitting electrode/receiving electrode dipole in question, i.e. on the relative positions of the electrodes of the pair of emitting electrode and receiving electrode in question.

The electric fields generated by all of the electrodes are superimposed in order to form a resultant electric field the topography of which depends not only on the positions and shapes of the emitting electrodes and on the potentials of these electrodes, but also on the positions and shapes of the receiving electrodes (the potential of which is that of the electrical earth), as well as on the positions and shapes of the disconnected electrodes.

In the disconnected state, an electrode $E_i$ is not electrically connected to any element of the detection system or of the mobile system. In particular, two different electrodes $E_i$ simultaneously put in the disconnected state are not connected to each other. A disconnected electrode $E_i$ is abandoned, i.e. it adopts the electric potential of the medium with which it is in contact. Its electric potential is not imposed. The electrode is free to polarize depending on its environment.

Furthermore, the disconnected state makes it impossible for an electric current to pass through an electrode put in this mode, since it is not integrated in a closed electrical circuit. The existence of this mode therefore makes it possible to impose the receiving electrodes through which an electric current will effectively pass.

The existence of the disconnected state therefore allows more possible viewpoints for the detection system than in the absence of this mode.

The variety of the possible combinations of types of electrodes is one of the factors that makes it possible to optimize the detection system with respect to the sought objective.

The reconfiguration of the electrodes, i.e. of the operating point of the system, between two successive series of measurements (the concept of series of measurements will be defined below), as will be described below, makes it possible to vary the topography of the electric field generated by the detection system in the surrounding scene from one series of measurements to the next.

An anisotropic electric field will for example give different information about the scene from the information obtained with an isotropic electric field. Two anisotropic electric fields having different topographies will provide different information, even if the detection system has not changed position and/or orientation.

The existence of the disconnected state makes it possible in particular to explore particular directions of the conductive medium, by generating an electric field with significant intensity essentially in particular directions, fixed among other things by the electrodes which are not in the "disconnected" state.

The existence of the disconnected state makes it possible, even with electrodes distributed over all of the surface of a mobile system as represented in FIG. 1, to define an electric field allowing the detection, the topography of which is very strongly anisotropic. For example, it is possible to disconnect all the electrodes except for those on one face. In this case, an electric current will possibly pass only through the electrodes on this face.

An electrode configured in the receiving state can be configured in two different measuring modes:

the measuring mode "I": in this case, the electric potential of this electrode is imposed and equal to that of the electrical ground of the system. The electrical value measured is the intensity of the electric current flowing in the receiving electrode, i.e. its phase and its amplitude are measured. To this purpose, N measurements of the intensity are carried out for each period of the signal, during P periods of the signal. If the signal contains several sinusoidal components, filtering steps having a bandpass adapted to the different components to be studied are carried out so as to measure the phase and the amplitude of each of the components of the electric intensity passing through the receiving electrode. The electric potential difference between the emitting electrode and the receiving electrode involved is in this case imposed, and therefore known, which ultimately makes it possible to deduce an impedance value for each frequency studied from the measurement.

the measuring mode "U": in this case, the potential of the receiving electrode is floating. The intensity of the electric current passing through the electrodes at the level of the emitting electrode as well as the electric potential at the level of the receiving electrode are measured, i.e. their respective phases and amplitudes are measured. To this purpose, N measurements of the intensity (respectively the voltage) are carried out for each period of the signal, during P periods of the signal. If the signal contains several sinusoidal components, filtering steps by means of electronic filters having a bandpass adapted to the different components to be studied are carried out so as to measure the phase and the amplitude of each of the components of the electric intensity passing through the emitting electrode (respectively of the electric potential of the receiving electrode).

The filtering stage is placed at the entrance of the setpoint-generating box such that the filtering of the different components is carried out on the digital signal originating from the measurement means after analog-to-digital conversion, before these data are processed in order to obtain the information about the position, the nature or the shape of the detected object.

Figure 4:
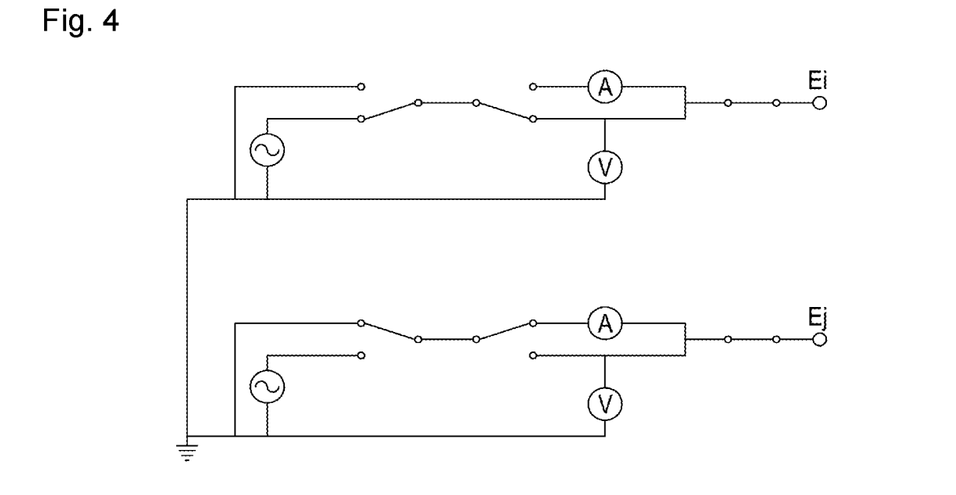
FIG. 4 shows the electrical circuit of the cells corresponding to the electrodes i and j in the connected state, when the electrode i is in measuring mode U and the electrode j is in measuring mode I.

FIG. 4 gives an operating point example for which the electrodes $E_i$ and $E_j$ are connected, the first being in the emitting state and the second being in the receiving state in the measuring mode I.

Each of the N measurements requires a characteristic "unit of time", which depends on the electronics effectively chosen to realize the detection system.

A series of measurements ends as soon as each of the N*P measurements for each of the components of the signal has effectively been realized. A series of measurements therefore comprises the evaluation of at least one electrical value (among the quantities electric intensity and electric potential) at the level of each of the electrodes configured in the receiving or emitting state.

The operating point of the system is fixed before each series of measurements by the configuration of the electrodes, and more specifically by the configuration of the following three parameters:

the state of each of the electrodes, chosen from the at least three states: emitting, receiving, disconnected;
the frequency of a component of an electrical signal emitted by at least one of the emitting electrodes;
the amplitude of the electrical signal emitted by at least one of the electrodes configured in the emitting state.

The characteristic impedance of the portion of electrically conductive medium between the emitting electrode and the receiving electrode of a given receiving electrode/emitting electrode dipole is then deduced from the difference in potential between these two electrodes and from the current passing through one of them for each of the working frequencies. These impedances can then be used by the detection system to obtain parameters characterizing the object to be detected (or the absence of an object).

It is therefore understood that, in this invention, the concept of detection comprises one and/or the other of the following two aspects: locating and characterizing an object. Reference could therefore be made synonymously to perception.

When a series of measurements is carried out, as many electric impedances as emitting electrode/receiving electrode dipoles formed in the chosen operating point can be evaluated for each of the working frequencies.

The detection system can be controlled in terms of amplitude in order to protect the electrodes: if the intensity of the current detected in one of the electrodes in measuring mode I is greater than a setpoint value, the series of measurements in progress stops and the amplitudes of the voltages at the terminals of the generators connected to the electrodes in the emitting state are reduced for the next operating point.

Figure 9:
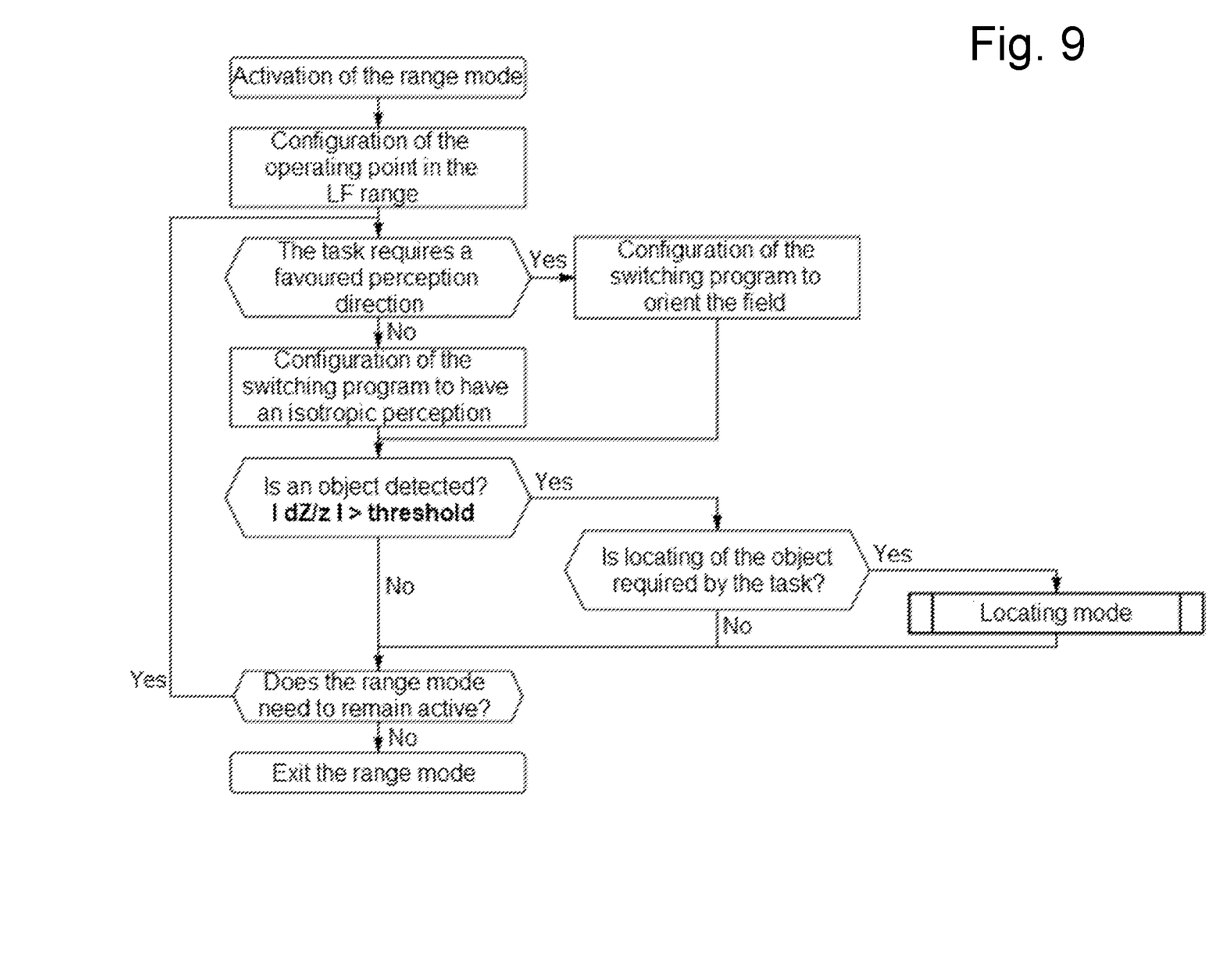
FIG. 9 shows an algorithm making it possible to implement the range mode.
Figure 10:
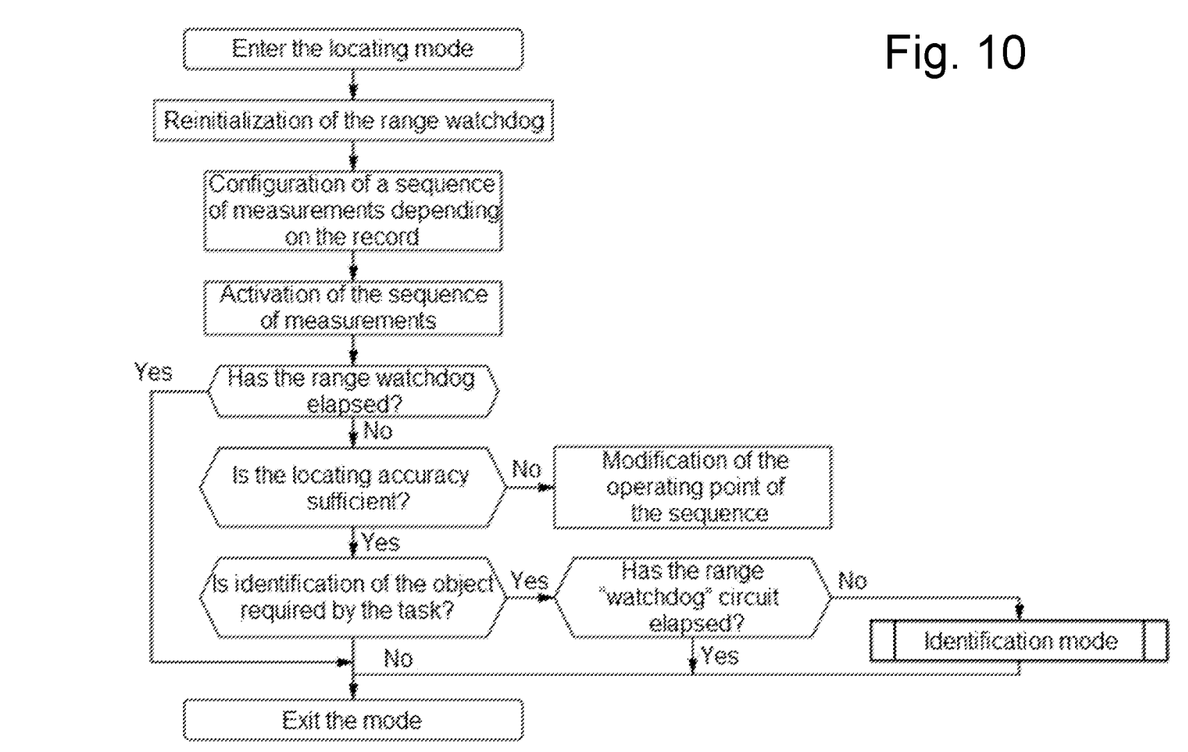
FIG. 10 shows an algorithm making it possible to implement the locating mode.
Figure 11:
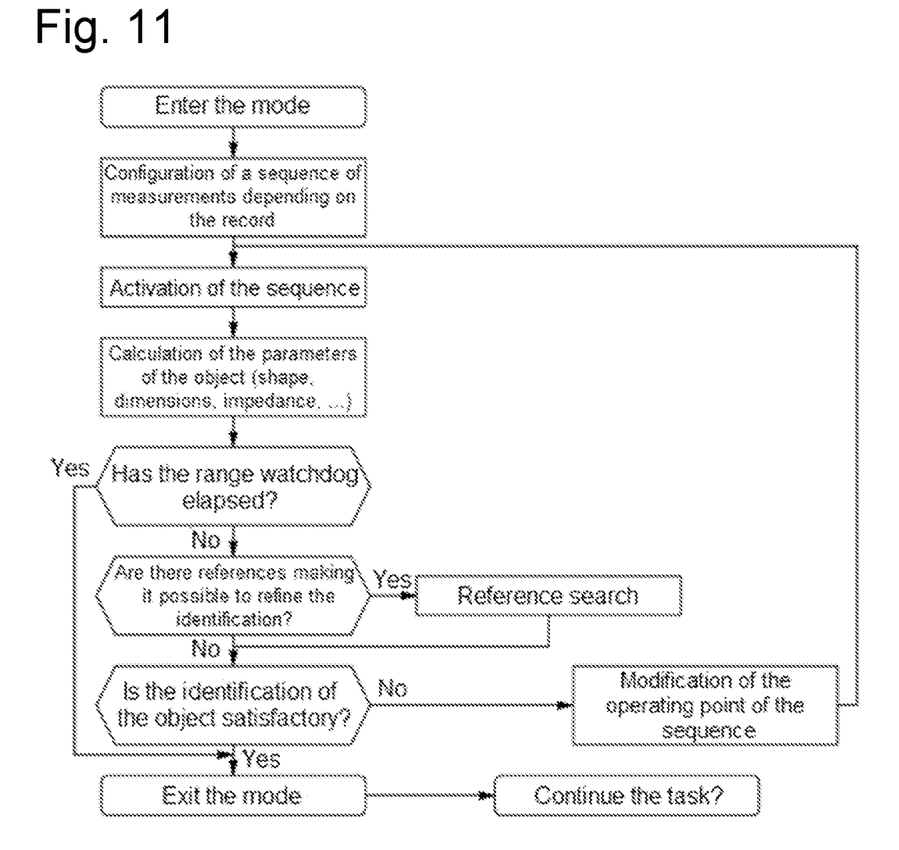
FIG. 11 shows an algorithm making it possible to implement the identification mode.

The results regarding the position and/or the shape and/or the nature of a possible detected object, or the fact that no object is detected, are finally potentially used by the setpoint-generating box of the detection system to determine the operating point of the system for the next series of measurements, for example following the algorithms represented in FIGS. 9 to 11.

According to an embodiment, in the detection method, the operating point of the system can be chosen in order that it corresponds to a "range" mode. In this case, the groups of electrodes put in the emitting or receiving states are determined as a function of the directions in which it is desired to obtain a maximum detection range, i.e. the distance at which an object can be detected is maximal for a nominal operation of the electrical components of the circuit.

Figure 5:
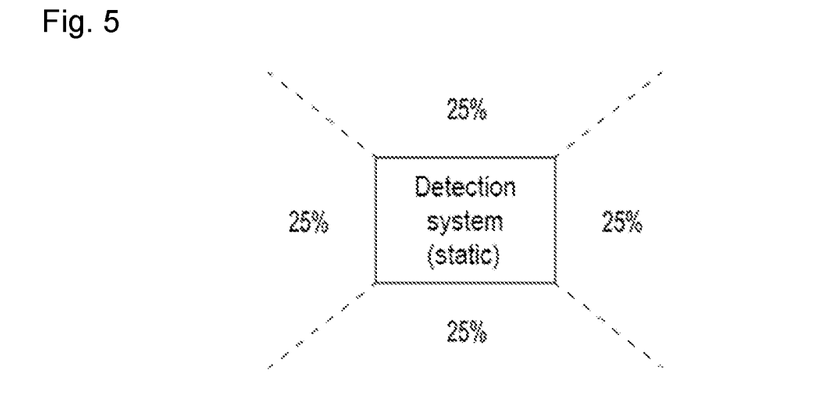
FIG. 5 shows the proportion of the time during which the electrodes are activated, as a function of their position on the detection system, in the simplified case of a detection system in a two-dimensional medium in the "isotropic" range mode. The detection system is immobile in the conductive medium in this particular example.

In a particular embodiment of the range mode, represented in a simplified version in FIG. 5, the distribution of the electrodes in each of the three states emitting, receiving and disconnected is "isotropic", i.e. as isotropic as possible given the positions of the electrodes $E_i$ of the detection system. None of the spatial directions is favoured in this distribution.

For example, in the case where a mobile system 100 is equipped with the detection system in the manner represented in FIG. 1, measurements in the range mode can be repeated 6n times. For each of the six series of n series of measurements, only electrodes inside, on the edges and/or on the corners of a single one of the six faces of the parallelepiped at a time can be put in the emitting state, the six faces being scanned successively.

FIG. 5 thus shows, in a simplified two-dimensional case, the time allocated to the activation of the electrodes on each of the four faces of the simplified rectangular mobile system equipped with the detection system.

In the range mode, the amplitudes of the voltages at the level of the emitting electrodes can be comprised within the range [0, 15V]. The shape and the frequency of the voltages can be the same for all of these electrodes. Such an isotropic realization of the range mode makes it possible for example to explore the space in the 3 directions of the frame of reference of the mobile system simultaneously with the same range.

Conversely, if the detection system has detected an object in a particular direction or if one direction is of particular interest for the exploration, for example if a mobile system 100 which is equipped with the detection system has a translational motion in this direction, the detection system will be able to be put in the range mode with an "anisotropic" management of the electrodes configured in the connected state.

Figure 6:
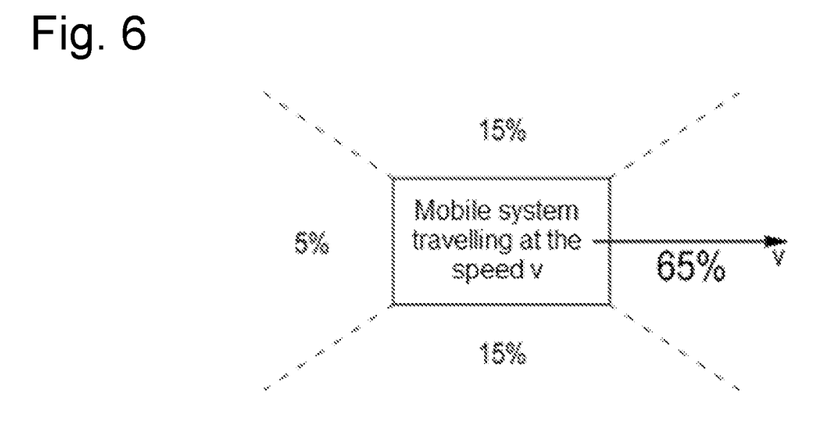
FIG. 6 shows the proportion of the time during which the electrodes are activated, as a function of their position on the detection system, in the simplified case of a detection system in a two-dimensional medium, in a particular embodiment of the "anisotropic" range mode. The detection system has a rectilinear translational motion in the conductive medium in this particular example.

In the simplified example shown in FIG. 6, for a detection system with which a two-dimensional mobile system is equipped, if the direction of interest is the direction [Ox], a fraction greater than 25% of the number of series of measurements (here 65% by way of example) will be carried out by activating electrodes only on the inside, on the edges and/or on the corners of the face with an outward-pointing normal direction in the same sense and direction as [Ox) and a fraction greater than half of the remaining measurements (here 15% by way of example) by activating electrodes only on the inside, on the edges and/or on the corners of the opposite face.

In a real three-dimensional case, n series of measurement in the range mode will be carried out, such that more than one sixth of the n series of measurements will be carried out by activating electrodes only on the inside, on the edges and/or on the corners of the face with an outward-pointing normal direction in the same sense and direction as [Ox) and a fraction greater than one fifth of the remaining measurements by activating electrodes only on the inside, on the edges and/or on the corners of the opposite face.

Figure 7:
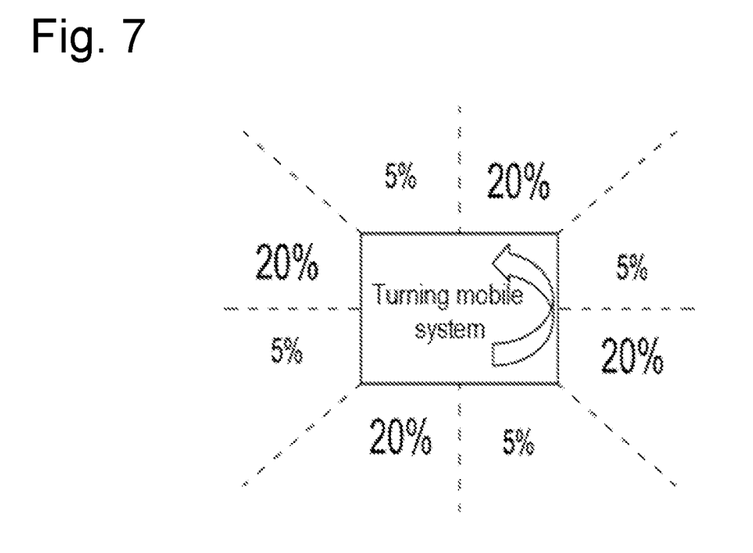
FIG. 7 shows the proportion of the time during which the electrodes are activated, as a function of their position on the detection system, in the simplified case of a system of detection in a two-dimensional medium, in a particular embodiment of the "anisotropic" range mode. The detection system is rotating about one of its axes of symmetry in this particular example.

In the case where the detection system is provided on a mobile system 100 that is rotating, the distribution of the number of measurements carried out in the different spatial directions can correspond to that described in a simplified manner in two dimensions in FIG. 7: in this case, the space around the detection system is subdivided into eight portions, four of these portions each being explored during a fifth of the time allocated to the measurements and the other four portions (which alternate with the first four portions) each being explored during a twentieth of the time allocated to the measurements.

These examples are non-limitative and the flexibility in choosing the operating point makes it possible to create other variants simply.

As the switching box makes it possible to reconfigure the electrodes automatically following the instructions transmitted by the setpoint-generating block, the detection system can, in a static mode, realize a mapping selectively of all or part of its environment. No movement of the detection system or of a mobile system 100 which is equipped with the detection system is necessary to obtain the desired map, i.e. to probe the different directions of interest, since the management of the configuration of the electrodes, for example taking results of earlier measurements into account, makes it possible by itself to choose the direction or directions explored, as well as the maximum distance at which these directions are explored.

In the range mode, the maximum distance at which the detection is possible in at least one given direction is optimized.

The amplitude and/or the frequency of each sinusoidal component of the signal at the level of the electrodes in the emitting state in the range mode are determined as a function of the nature of the conductive medium.

Figure 8:
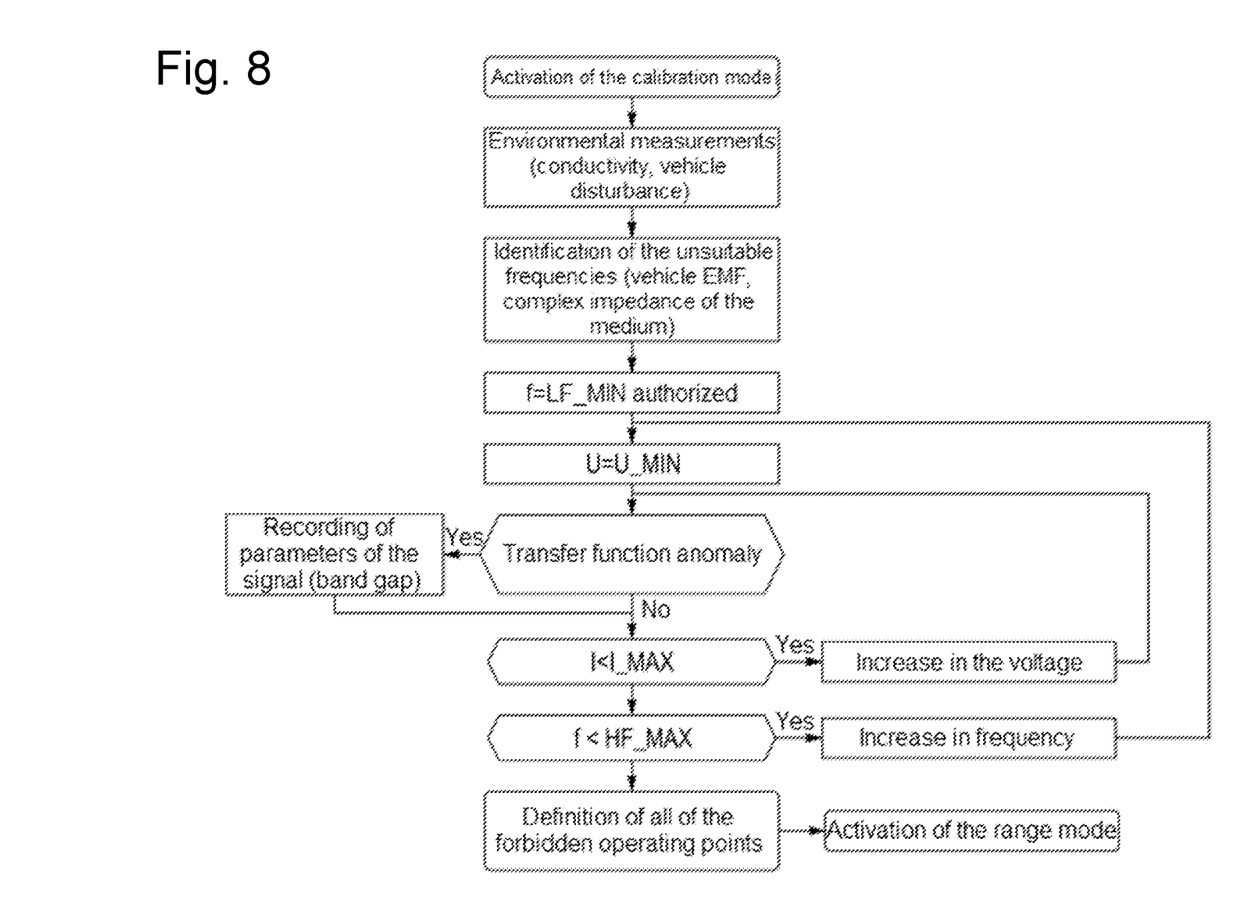
FIG. 8 shows an algorithm making it possible to implement the calibration mode.

A calibration phase following the algorithm in FIG. 8 can be considered before the phase of measurement in the range mode. To this end, it is possible to carry out a frequency scan in the range]0 Hz, 3 MHz] over a repetition of n successive series of measurements in order to identify the most suitable frequency [frequencies] for maximizing the range in the medium explored. In water, a working frequency f=10 kHz for example can be chosen.

This calibration phase can also be used to identify the forbidden working frequencies, in particular the natural frequencies (and their harmonics) of the mobile system 100 which is equipped with the detection system. The mobile system 100 here includes the equipment of this system, for example a sonar.

In a particular embodiment, the frequency scan can be carried out in the range]0 Hz, 25 kHz], the low frequencies most often being the most relevant for optimizing the detection range.

These examples are, of course, non-limitative: it is possible to realize a frequency scan in the range]0 Hz, 3 MHz] in order to determine the working frequency or frequencies optimizing the detection range in a given direction of the conductive medium if for example the composition of the latter is not known beforehand.

If the detection system is close to a water-sediment interface, the potential of the emitting electrodes will more advantageously be the combination of two sinusoidal potentials. For example, two sinusoidal potentials with an amplitude comprised between 0 and 15 V and with frequencies of which one is equal to 10 kHz and the other is greater than 10 kHz, for example 67 kHz, are combined. The electrical signal with the greatest frequency makes it possible in particular to obtain a better range in the sediment. The amplitude is fixed so as to have the most intense signals possible at the level of the receiving electrodes, without exceeding the threshold value of the intensity at the level of the electrodes in measuring mode I.

According to an embodiment, in the detection method, the operating point of the system can correspond to a "locating" mode, i.e. the distance between the detection system and the detected object in a given direction is measured with a maximum accuracy with respect to the particular distance value at which the object is situated, while remaining in a nominal operating mode. In this case, the positions of the electrodes configured in the emitting or receiving states are for example determined as a function of the directions in which an object has been detected.

In a particular embodiment, the amplitude and/or the frequency of the sinusoidal components of the signal at the level of the electrodes in the emitting state are determined in order to optimize the accuracy of the locating. The amplitude of the signal can in particular be fixed as a function of the position and the nature of the detected object; in particular the maximum value of the amplitude which makes it possible, with respect to the position and the nature of the detected object, not to exceed the maximum intensity authorized at the level of the receiving electrodes can be selected.

The frequency of the signal can be chosen after a frequency scan. Thus, when an object is present in the conductive medium, because of the skin effect, the measured signals are different from those which would be measured in the absence of an object, if the object is situated in the detection zone corresponding to the chosen operating point. At low frequency, the range is larger than at high frequency, but the accuracy of the locating is less good. When the frequency increases, there is therefore a threshold frequency beyond which the measured signal is identical to that of the conductive medium without object. The working frequency chosen for the locating is close to the threshold frequency, so that the accuracy of the locating is maximal.

This embodiment does not require movement of the detection system (or of a mobile system 100 which is equipped with it) with respect to the detected object, even if such a movement remains possible. The—automated— reconfiguration of the electrodes, and in particular of the frequency of the emitted signal, is sufficient to obtain the information needed for the optimization of the locating.

According to an embodiment, the detection method can fix the operating point of the system in order that it corresponds to an "identification" mode, i.e. the shape and/or the nature of the detected object are determined with a maximum accuracy.

In order to detect more precisely the shape of an object of interest, the electrodes configured in the emitting or receiving states are determined as a function of the direction in which the object has been detected and n series of measurements are carried out such that only electrodes on the inside, on the edges and/or on the corners of the face with an outward-pointing normal corresponding to the direction of interest are in the connected state and that different combinations of electrodes are used over the n series of measurements, so as to deduce the shape of the object from the measurements. In order to confirm the shape of the obstacle, the electrodes are for example switched asymmetrically from one series of measurements to the next in a given direction. It can thus be confirmed that an object situated under the lower face of the detection system has a certain extension in the direction (x'x) by connecting the electrodes on the lower face by successive groups in the direction (x'x), the other electrodes on this face being disconnected: first the electrodes closest to the rear face, then their neighbours in the direction (x'x), up to the electrodes closest to the front face. The differences or similarities between the results of the n series of measurements then make it possible to deduce the shape of the object in the direction (x'x).

In order to confirm the nature of the obstacle, the frequency of the electric voltage imposed on the electrodes in the emitting state can for example be modified in order to carry out a scan in the range]0 Hz, 3 MHz] over a succession of n series of measurements in the "identification" mode.

It is then possible to obtain information about the nature of the detected object. For example, the presence of an electrically insulating object will result in a measured electric current intensity lower than the intensity of the current measured in the absence of this object, whereas this intensity will be greater than that in the absence of the object if this object is electrically conductive.

A homogeneous object of a mineral nature for example will not induce a phase difference between the emitted signals and the measured signals, whereas the presence of an object of a biological nature, as long as the cells which constitute it behave like capacitors, will result in a phase difference between the emitted and measured signals.

It is also possible to obtain information about a detected object (such as, by way of example, the shape, size, electrically conductive or insulating nature) of the object, for example by comparing the measurements with known references, i.e. a database of object and influence of immersing this object in the conductive medium on the electrical signals measured by the detection system, either on the basis of electrical and mechanical evolution models of the scene or by comparing the measurements with known signature bases, or by an item of information completed beforehand in view of the task. The methods are not mutually exclusive.

In this operating mode, a database of signatures, called "electrical sense" signatures of objects of interest (such as mines, cables, pipes), can thus be formed. When the detection system is deployed in situ, comparison with the database can then be made in order to deduce from it one or more items of information about a detected object.

The implementation of the locating mode does not require (without ruling it out!) moving the detection system (or a mobile system which is equipped with it) with respect to the detected object. The—automated— reconfiguration of the electrodes, and in particular of the frequency of the emitted signal, is sufficient to obtain the information needed for the identification.

According to an embodiment, the detection method can be implemented by means of a computer program executed on a processor integrated in the detection system. The main steps of this computer program will now be described with reference to FIGS. 8 to 11.

In a particular embodiment, the detection system can be configured in the "range" mode at the beginning of the detection. An example of an algorithm detailed for the "range" mode is given in FIG. 9. A first optional step of frequency scanning, corresponding to a calibration phase, can be carried out if the medium is not known beforehand, in order to determine the optimum working frequency in this mode.

In the absence of an object in the medium or of an interface with another conductive medium, the electrical impedance of the medium adopts a reference value which can be given beforehand or measured during the calibration phase. The presence of an object or of an interface modifies this electrical impedance such that the distance of the object or of the interface can be evaluated.

As long as no object or interface is detected at a distance smaller than a threshold distance d1, the system remains in the range mode. If an interface with another medium is detected at a distance smaller than a threshold distance d1, the frequency scan is repeated.

Otherwise, if an object is detected at a threshold distance smaller than a distance d2, the system is put in the "locating" mode for the next measurement, an example of an algorithm of which is given in FIG. 10, and remains in this mode as long as the distance between the object and the system is greater than a threshold distance d3.

If the distance between the object and the system becomes greater than the distance d2 again, the system again passes into the "range" mode.

If, in contrast, the distance between the object and the system becomes smaller than the threshold distance d3 and if the task requires it, the system is put in the "identification" mode for the next measurement. It then performs series of measurements making it possible for it to deduce the shape and nature of the object with the best possible accuracy.

The task can be defined in the form of instructions given beforehand.

When the identification is satisfactory, the task continues with the mode adapted to the next job.

In the case where a mobile system is equipped with the detection system, the "range" mode can be given priority over the other modes in order to prevent possible collisions. More specifically, the detection system contains a watchdog, which requires the detection system to return to the range mode every time a period of the watchdog has elapsed.

According to an embodiment, the detection method can be implemented on a mobile system 100 in the electrically conductive medium and equipped with the detection system. The results of the detection method can in this case be used to guide the movement of the mobile system 100, for example in order to avoid obstacles, or to position the mobile system at a distance and in an orientation of interest with respect to a wall, an interface or an object present in the medium.

The task can therefore integrate setpoints in relation to the movement of the mobile system 100.

In an embodiment, the box for configuring the operating point uses the record of the measurements as a basis in order to determine the next operating point.

In another embodiment, the operating point can be fixed by an algorithm chosen beforehand, independently of the measurements carried out, within the limit of the automatic control thresholds of the system.

Figure 13:
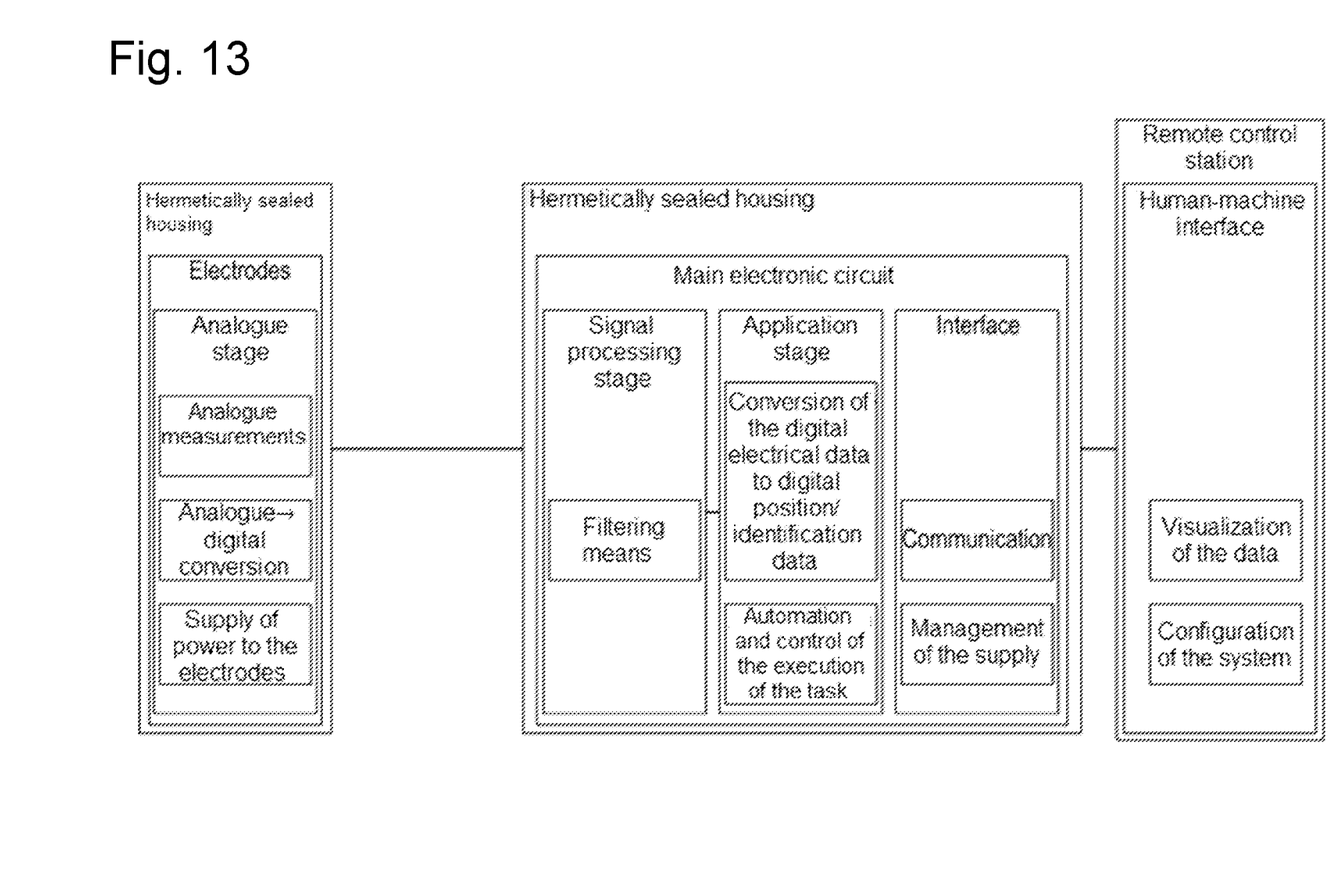
FIG. 13 schematically shows the different stages of the system in the "centralized electronics" embodiment.

In a particular embodiment, called "distributed electronics", the detection system comprises one generator per electrode and all of {generator—electrode—analog measurement means—analog-to-digital conversion stage} are connected via a bundle of flexible cables to the hermetically sealed housing containing the setpoint-generating block and the switching box, in accordance with FIG. 13. This embodiment makes it possible to route only digital signals through the flexible cables, which provides for a better noise immunity.

It is also possible to provide only a single generator supplying power to all the electrodes put in the connected mode, the generator in this case being situated in the hermetically sealed housing containing the setpoint-generating block.

Finally, in a particular embodiment, the detection system contains an interface for communication with a remote control station, by means of which an operator can visualize the data originating from the detection process and configure the detection system, in particular specify to it the task or tasks to be completed.

Once the detection system has been immersed, it is therefore possible for a remote operator to modify the task remotely or else to take control of the setpoint-generating block in order to impose a particular configuration on the detection system.

The multiple possibilities for configuring the electrodes of the detection system combined with the automatic nature of the reconfiguration of the electrodes, possibly with the intervention of a remote operator, therefore make it possible for the detection system to provide mapping data of the surrounding space without prior knowledge of this space. The mapping data can correspond to a zone of the space surrounding the detection system, which can be chosen statically, but can also change dynamically either because of the movement of the detection system, for example because a mobile system 100 is equipped with it, or because of earlier detection results.

By mapping data is meant information having at least one spatial character about the electrically conductive medium. In particular, but non-limitatively, it can be the position, and possibly the shape, of possible interfaces with other media (liquids, gases or solid). It can also be the position (spatial coordinates) of a solid object in this medium, and/or its shape and/or the nature of this object, for example its electrically insulating or conductive nature.

Passing from the range mode to the locating mode for example amounts to reducing the zone of the space covered by the map established in order to concentrate on the zone in which an object has been detected, and possibly to changing the scale of the map in order to obtain a greater level of detail in this particular zone.

LIST OF REFERENCE SIGNS

100: mobile system equipped with a detection system

Ei (i integer from 1 to n): i-th electrode of the detection system

S1$i$ (i integer from 1 to n): switch making it possible to select the state of the electrode i, if it is connected, from the emitting and receiving states.

S2$i$ (i integer from 1 to n): switch making it possible to select the measuring mode of the electrode i from the modes U and I.

S3$i$ (i integer from 1 to n): switch making it possible to select the connection state of the electrode i from the connected and disconnected states.

The invention claimed is:

1. A method of detection in an electrically conductive medium by means of a detection system containing:
   a plurality of electrodes in direct electrical contact with said medium, the state of which can be chosen from the list {emitting, receiving, disconnected},
   a device for measuring at least one electrical value for each of said electrodes configured in the emitting or receiving state, chosen from the list {electric intensity passing through the electrode, electric potential of the electrode},
   a switching device making it possible to configure each of said electrodes in the state chosen from the list {emitting, receiving, disconnected},
   at least one processor exchanging information with the measurement device and the switching device,
   wherein the method comprises:
   a) the processor determines an operating point of the detection system as a function of:
   a setpoint given a priori,
   and/or an earlier configuration of the detection system,
   and/or a result of an earlier measurement at the level of at least one of said electrodes transmitted by the measurement device,
   the determination of said operating point of the detection system comprising the determination of the following three parameters:
   state of each of the electrodes, chosen from the three states: emitting, receiving, disconnected,
   a frequency of at least one sinusoidal component of an electrical signal emitted by at least one of the electrodes configured in the emitting state,
   an amplitude of the electrical signal emitted by at least one of the electrodes configured in the emitting state,
   b) the switching device receives information about the operating point of the system determined by the processor and configures the detection system in the determined operating point,
   c) a series of measurements is carried out by the measurement device, a series of measurements consisting of evaluating at least one electrical value at the level of each of the electrodes configured in the receiving or emitting state, and the measurement device transmits the measurement data to the processor.

2. The detection method according to claim 1, characterized in that the processor further calculates, based on the measurement data, at least one item of mapping data of the conductive medium.

3. The method of detection in an electrically conductive medium according to claim 2, characterized in that, if an object is detected in a step d, an amplitude and/or a shape and/or a frequency of the sinusoidal components of the electrical signal emitted by each of the electrodes configured in the emitting state for an operating point determined in a later a) are determined as a function of the distance of the detected object.

4. The method of detection in an electrically conductive medium according to claim 2, characterized in that, if an object is detected based on a calculated item of mapping data, positions on said system of the electrodes configured in the emitting state for an operating state determined in a later a) are determined as a function of a shape and/or a position of a detected object.

5. The method of detection in an electrically conductive medium according to claim 2, characterized in that known references are used to determine the at least one item of mapping data.

6. The detection method according to claim 1, characterized in that a), b) and c) are repeated in the same order at least once, and in that setpoints are transmitted to said processor in order to control the repetition of a), b) and c) either before the first a) of the detection method by a remote or non-remote operator or during the detection method by a remote operator.

7. The method of detection in an electrically conductive medium according to claim 1, characterized in that the operating point of the system determined in a) can be chosen from the list {"range" mode, "locating" mode and "identification" mode}, the "range" mode making it possible to obtain a maximum detection range in one or more given directions of said medium, the "locating" mode making it possible to obtain a maximum accuracy concerning the locating of a previously detected object, the "identification" mode making it possible to obtain a best resolution concerning the shape and/or the composition of a previously detected object.

8. The method of detection in an electrically conductive medium according to claim 7, characterized in that a), b) and c) are repeated in the same order at least once and the operating point of the detection system passes automatically from an a) to the next:
- from the "range" mode, if it was in this mode, to the "locating" mode when an object is detected and this object is located at a distance smaller than a threshold distance d2,
- from the "locating" mode, if it was in this mode, to the "identification" mode when an object is detected and this object is located at a distance smaller than a threshold distance d3 or with a shape and/or nature corresponding to a setpoint,
- from the "locating" mode, if it was in this mode, to the "range" mode when an object is detected and the distance at which a detected object is situated becomes greater than a threshold distance d2.

9. The method of detection in an electrically conductive medium according claim 1, characterized in that a shape and/or a frequency and/or an amplitude of the electrical signal emitted by the electrodes configured in the emitting state for an operating point determined in an a) are chosen at the end of a frequency scan.

10. The method of detection in an electrically conductive medium according to claim 1, characterized in that the signal emitted by at least one of the electrodes configured in the emitting state for an operating point determined in an a) is the combination of at least two sinusoidal signals having different frequencies.

11. The computer program comprising program code instructions for executing the steps of the method according to claim 1 when said program is executed on a computer.

12. A system of detection in an electrically conductive medium comprising:
- a plurality of electrodes in direct electrical contact with said medium, the state of which can be chosen from the list {emitting, receiving, disconnected},
- a device for measuring at least one electrical value for each of said electrodes put in the emitting or receiving state, chosen from the list {intensity of the electric current passing through the electrode, electric potential of the electrode},
- a switching device making it possible to configure each of said electrodes in the state chosen from the list {emitting, receiving, disconnected},
- at least one processor exchanging information with the measurement device and the switching device, and configured to determine an operating point of the detection system as a function of:
- a setpoint given a priori,
- and/or an earlier configuration of the system,
- and/or a result of an earlier measurement at the level of at least one of said electrodes transmitted by the measurement device,
- the determination of said operating point of the system comprising the determination of the following three parameters:
- state of each of the electrodes, chosen from the at least three states: emitting, receiving, disconnected,
- frequency of at least one sinusoidal component of an electrical signal emitted by at least one of the emitting electrodes,
- amplitude of the electrical signal emitted by at least one of the electrodes configured in the emitting state,
- the processor transmitting information about the determined operating point to the switching device.

13. The mobile system in an electrically conductive medium equipped with a detection system according to claim 12 further containing a control module suitable for controlling a movement of said mobile system on the basis of the measurement results of the detection system obtained by following the method of claim 1.

14. The mobile system in an electrically conductive medium according to claim 13, characterized in that said electrodes of the detection system are distributed over at least a portion of a surface of said mobile system in contact with said medium.

* * * * *